(12) United States Patent
Siercks

(10) Patent No.: US 9,273,946 B2
(45) Date of Patent: Mar. 1, 2016

(54) LOCATION DETERMINATION APPARATUS WITH AN INERTIAL MEASUREMENT UNIT

(71) Applicant: Hexagon Technology Center GmbH, Heerbrugg (CH)

(72) Inventor: Knut Siercks, Mörschwil (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 68 days.

(21) Appl. No.: 14/323,990

(22) Filed: Jul. 3, 2014

(65) Prior Publication Data
US 2015/0330760 A1 Nov. 19, 2015

(30) Foreign Application Priority Data

Jul. 8, 2013 (EP) .................................. 13175564

(51) Int. Cl.
G01B 7/008 (2006.01)
G01D 5/20 (2006.01)

(52) U.S. Cl.
CPC .............. G01B 7/008 (2013.01); G01D 5/2006 (2013.01)

(58) Field of Classification Search
CPC .............................. G01B 7/008; G01D 5/2006
USPC .......................................................... 33/503
See application file for complete search history.

(56) References Cited

U.S. PATENT DOCUMENTS

| | | | |
|---|---|---|---|
| 6,158,136 A * | 12/2000 | Gotz ...................... | G01B 3/008 33/503 |
| 7,830,500 B2 | 11/2010 | Aebischer et al. | |
| 8,085,394 B2 | 12/2011 | Vokinger et al. | |
| 8,621,956 B2 | 1/2014 | Simeonidis et al. | |
| 2011/0119025 A1* | 5/2011 | Fetter ..................... | G01B 5/008 702/152 |
| 2012/0017453 A1* | 1/2012 | Ogihara ............... | G01B 21/045 33/503 |
| 2012/0084989 A1* | 4/2012 | Pettersson ............ | G01B 21/045 33/503 |
| 2013/0125408 A1* | 5/2013 | Atwell ................. | G01B 11/005 33/503 |
| 2014/0007441 A1* | 1/2014 | Pettersson ............ | G01B 21/045 33/503 |
| 2015/0233742 A1* | 8/2015 | Vokinger ............... | G01B 11/14 324/207.24 |
| 2015/0285616 A1* | 10/2015 | Jordil .................... | G01B 21/047 348/135 |
| 2015/0300798 A1* | 10/2015 | Pettersson .............. | G01B 21/04 33/503 |

FOREIGN PATENT DOCUMENTS

| | | |
|---|---|---|
| EP | 2 570 769 A1 | 3/2013 |
| WO | 2007/051575 A1 | 5/2007 |
| WO | 2008/019835 A1 | 2/2008 |
| WO | 2008/141817 A2 | 11/2008 |
| WO | 2009/026641 A1 | 3/2009 |

OTHER PUBLICATIONS

European Search Report dated Nov. 25, 2013 as received in Application No. EP 13 17 5564.

* cited by examiner

*Primary Examiner* — G. Bradley Bennett
(74) *Attorney, Agent, or Firm* — Maschoff Brennan

(57) ABSTRACT

Some embodiments of the invention relate to a location determination apparatus for determining a location of two components relative to one another. The apparatus may comprise at least one location encoder having a read head in cooperation with a code for generating first position determination data at a first measurement frequency. According to some embodiments of the invention, at least one inertial measurement unit is arranged for additionally determining translational and/or rotational accelerations of at least one of the two components and, moreover, for generating second position determination data with respect to the location at a second measurement rate.

20 Claims, 6 Drawing Sheets

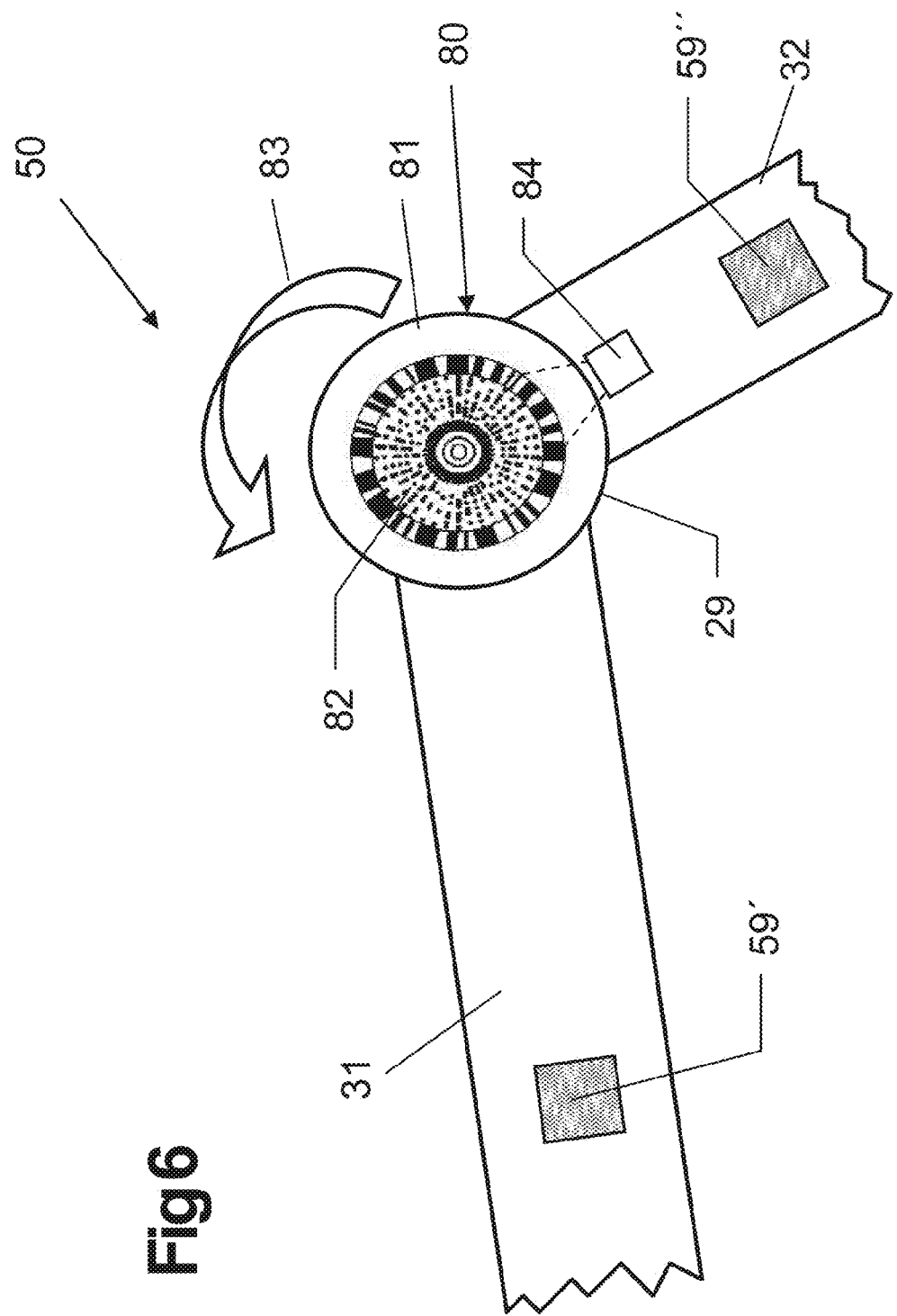

LOCATION DETERMINATION APPARATUS WITH AN INERTIAL MEASUREMENT UNIT

FIELD OF THE INVENTION

The invention relates to a location determination apparatus for determining a position of a target object and for use in a measuring machine, in particular in a coordinate measuring machine or a geodetic surveying system, and to a measuring machine, equipped with such a location determination apparatus, and to a measurement method and to an associated computer program product.

BACKGROUND

Determining directions, angles and lengths as locations is required in many fields of application, such as e.g. geodetic surveying and for industrial measurements. Developments in angle metrology have led, via mechanical read processes, to fully automated location measurements, in particular angle or path measurements according to the current prior art.

Known automated location determination apparatuses generally comprise a code carrier and a scanning apparatus. In the case of angle measurement apparatuses, so-called angle encoders, the code carrier is usually embodied rotatably about an axis relative to a scanning apparatus, wherein an angle location of the code carrier then constitutes the variable to be measured. By way of example, the code carrier can have a division or encoding for determining the position, wherein the encoding may be applied to a surface or lateral face of the code carrier.

For the purposes of automatically acquiring the location, the code carrier, which is movable relative to the scanning apparatus, is scanned by a read head by means of various techniques. Known scanning methods include electronic-magnetic, electronic and optoelectronic methods (i.e. inductively based, capacitively based and optically based).

By way of example, location determination apparatuses are used in coordinate measuring devices or coordinate measuring machines (CMM).

An optical detector of an angle encoder for reading an optically readable code carrier, as described in WO 2008/019835, is, for example, a photodetector, a CCD line array or a CCD area array. In general, the code carrier is embodied as a circular disk or as a circular ring and carries a position code, which can be acquired optically, along the circumference thereof, of which code a section is imaged on the detector.

As disclosed in e.g. WO 2007/051575, known angle measurement devices generally comprise a so-called circular arc and a scanning apparatus. The circular arc is embodied as code carrier and has a division or encoding for determining the position on the circle. The encoding is applied to a surface, i.e. a circle face or a lateral face, of the code carrier.

WO 2008/141817 discloses a location determination apparatus with a linear encoder and/or an angle encoder. The code carrier and scanning apparatus are arranged in such a way that relative movement in one degree of freedom, in particular a relative rotational movement or a relative longitudinal movement along one axis, is made possible between code carrier and scanning apparatus.

The known location determination apparatuses, in particular for coordinate measuring machines or geodetic surveying machines such as e.g. total stations, have very different advantages and disadvantages.

Known location encoders, such as linear encoders and angle encoders, are characterized by a high measurement accuracy for supplying relative (i.e. incremental) or absolute position determination data, but a relatively low measurement speed, for example of the order of between 1 Hz and 20 Hz, and, as a result thereof, relatively low possible reading speed. Designs with a comparatively increased possible measurement speed are relatively expensive, in particular due to the more complicated mechanics and electronics required for this.

SUMMARY

Some embodiments may include an improved location determination apparatus, in particular for use in coordinate measuring machines or geodetic surveying machines. Specifically in this case, an increased measurement speed is intended to be made possible, wherein, in particular, only small, or no, losses in respect of measurement accuracy have to be accepted.

Some embodiments may make such an improved location determination apparatus available with the smallest possible production outlay.

The location determination apparatus, according to the invention, for two components, mobile relative to one another, of a measuring machine, in particular of a coordinate measuring machine or of a geodetic surveying system, is embodied for determining a location of the two components relative to one another. It comprises at least one location encoder having a read head in cooperation with a code. The location encoder is embodied for generating first position determination data with respect to the location at a first measurement rate.

According to the invention, the location determination apparatus furthermore comprises at least one inertial measurement unit for determining translational and/or rotational accelerations of at least one of the two components and, therefore, for generating second position determination data with respect to the location at a second measurement rate—which is higher than the first measurement rate.

For determining the location, to the brought about by an evaluation unit, the evaluation unit is now embodied and configured to acquire the first position determination data generated by the at least one location encoder and the second position determination data generated by the at least one inertial measurement unit, correlate said position determination data with one another and determine the location therefrom at a third measurement rate, which is at least higher than the first measurement rate.

In particular, the evaluation unit in this case is embodied and configured to determine the location on the basis of the second position determination data for times within intermediate time windows which lie between successive measurement times of the first measurement rate. Here, specifically, the second position determination data can be used only in each case for the intermediate time window and the location is determined on the basis of the first position determination data only for measurement times of the first measurement rate.

Advantageously, the evaluation unit is embodied and configured to reference the acquired second position determination data, in each case with respect to a respectively most current available value for the first position determination data. To this end, for example, the second position determination data, received by the inertial measurement unit, can be corrected at predetermined time intervals to first position determination data, received in advance by the location encoder, as (more precise) reference and therefore it is possible to set a respectively new initial value for further second position determination data to be received over the course of time such that a drift over the second position determination data, generated over time during the intermediate time windows, can be reset to zero, in each case with the clock of the first measurement rate, when determining the location.

In particular, the evaluation unit can be embodied to correlate the first position determination data and the second position determination data with the aid of a defined algorithm, in particular a Kalman filter or a divided-difference filter, to which the first and second position determination data are fed and which operates clocked at a rate which is at least as high as the third measurement rate, in particular wherein the rate equals the third measurement rate.

As a result, an improved location determination apparatus is provided, which enables an increased measurement speed at a measurement accuracy which is comparable to that of established location encoders. Here, the high measurement accuracy is ensured by the use of location encoders and the high measurement speed is ensured by the combination of the measurements by means of the location encoder with measurements by means of the inertial measurement unit. A permanently high measurement accuracy is ensured by the inventive, repeated balancing of the data determined by the inertial measurement unit with the measurement values of the location encoder (in particular, wherein the balancing is repeated with the clock of the first measurement rate).

By way of example, data calculations with the aid of a Kalman filter are suitable for correlating the first and the second position determination data—as mentioned previously. Such an algorithm enables faster data processing.

The combination according to the invention of first position determination data, gathered at a comparatively low measurement rate, and second position determination data, gathered at a comparatively high measurement rate, enables, as a result of this cooperation, a high measurement rate of the location determination apparatus according to the invention, for example of the order of 1000 Hz and more.

Advantageously, this renders possible the use, also, of location encoders which operate relatively slowly, e.g. at only 1 Hz, but are more cost-effective since the slow measurement speed thereof is compensated for by the combination with the measurement data from inertial measurement units having a fast mode of operation.

In accordance with one embodiment of the invention, at least one inertial measurement unit and one location encoder are respectively assigned to one another for correcting and resetting the received second position determination data to first position determination data received previously.

The location encoder can have different technical embodiments. In one embodiment, the read head can have an optically reading sensor, in particular a sensor line or an area sensor, and the code can be formed by an optically readable pattern made of a multiplicity of optical code elements (e.g. with specific light transmissivity, reflectivity, refraction or diffraction properties, as known to a person skilled in the art per se). In another embodiment, the read head can have a capacitively reading sensor, in particular with one or more capacitors, and the code can be formed by a capacitively readable pattern made of a multiplicity of code elements with specific permittivity, in particular structured plates or plastic strips. In another different embodiment, the read head can have an inductively reading sensor, in particular one or more coils, and the code can be formed by an inductively readable pattern made of a multiplicity of code elements with specific permeability, in particular magnetic strips.

In accordance with one embodiment of a location determination apparatus according to the invention, the location encoder is embodied as a linear encoder with a read head for reading a linear code. In accordance with another embodiment, the location encoder is embodied as an angle encoder with a read head for reading a code arranged in a substantially circular or circular arc shaped manner.

Therefore, the location determination apparatus according to the invention can be equipped with a conventional, widely available location encoder.

In accordance with one embodiment, the inertial measurement unit has acceleration sensors and/or gyroscope sensors, and is embodied as a MEMS microsystem or MOEMS microsystem (i.e. as "micro-electro-mechanical system" or as "micro-opto-electro-mechanical system"). What is essential here is that the inertial measurement unit renders it possible to determine an acceleration in every direction or a rate of rotation about every axis in which the two components, the relative location of which is intended to be determined, are mobile relative to one another (such that the inertial measurement unit can measure position data corresponding to the measurement data which can be generated by the location encoder).

However, even if this is not mandatory for the invention, the inertial measurement unit can also be embodied to determine acceleration measurement values with respect to three spatial directions, which are, in particular, orthogonal to one another, and to determine rates of rotation about three axes, which are, in particular, orthogonal relative to one another.

As is known to a person skilled in the art, by the appropriate combination of a plurality of inertial sensors of an inertial measurement unit, the accelerations of the six degrees of freedom can, in the process, generally be measured on the basis of the following types of sensor:

Three orthogonally arranged acceleration sensors (also referred to as translation sensors) detect the linear acceleration along the x- or y- or z-axis. From this, it is possible to calculate the translational movement (and the relative position). Three orthogonally arranged rate sensors (also referred to as gyroscopic sensors) measure the angular acceleration about the x- or y- or z-axis. From this, it is possible to calculate the rotational movement (and the relative alignment).

In general, such inertial sensors in this case are not suitable for continuous, precise determinations of the position since they only supply measurement values based on accelerations, but no absolute position determination data. As a result of this, position determination data derived from the measurement values of such sensors is subject to a continuous drift, in particular on the basis of propagating and hence accumulating errors in the measurement of accelerations or location changes. However, as a result of the embedding, according to the invention, into a location determination unit, this disadvantage does not have a substantially negative effect on the overall result of the location determination.

Such inertial measurement units, which are based on MEMS-based components and which are embodied as miniaturized machines or components, are known from the prior art.

The subject matter of the present invention also relates to a measuring machine, in particular a coordinate measuring machine CMM (with a portal or articulated arm design, or else embodied as a laser tracker) or a geodetic surveying system (such as a theodolite or a tachymeter), for determining a position of a target object, comprising a location determination apparatus according to the invention according to one of the embodiments described above. The location determination apparatus is then used to determine angles in hinges (see hinged-arm CMM, laser tracker, theodolite or tachymeter) or lengths in linear displacement mechanisms (see e.g. portal CMM).

In accordance with one preferred embodiment, at least one inertial measurement unit is assigned to each mobile and/or separately mobile element of the measuring machine for measuring accelerations or changes in location.

The subject matter of the invention also relates to a measurement method for determining a position of a target object using a location determination apparatus according to the invention, which comprises at least one location encoder with a read head in cooperation with a code, and at least one inertial measurement unit. Inter alia, the measurement method comprises the following steps: determining the absolute position of the target object and generating first absolute position determination data at a first measurement frequency by means of the at least one location encoder, and determining translational and/or rotational accelerations and/or changes in location of mobile components of the location determination apparatus and generating second position determination data of the position of the target object at a second measurement frequency by means of the at least one inertial measurement unit.

According to the invention, the measurement method comprises the following further steps: reading, with the aid of the evaluation unit, the first position determination data generated by the at least one location encoder and the second position determination data generated by the at least one inertial measurement unit, correlating, with the aid of the evaluation unit, the read first position determination data and second position determination data in time, correcting the second position determination data received by the inertial measurement unit at predetermined time intervals to absolute first position determination data received in advance by the location encoder and, thereby, setting a respectively new initial value for further second position determination data to be received over the course of time.

Preferably, the first and second position determination data are correlated using a Kalman filter in this case.

Advantageously, the measurement method according to the invention is carried out at a measurement rate of 1000 Hz and more.

The subject matter of the invention moreover relates to a computer program product with program code, which is stored on a machine-readable medium, for carrying out the measurement method according to the invention, in particular if the program code is executed on an evaluation unit of a location determination apparatus according to the invention.

BRIEF DESCRIPTION OF THE DRAWINGS

The location determination apparatus according to the invention, a coordinate measuring machine or geodetic surveying system equipped with such a location determination apparatus, and an associated measurement method according to the invention are described in more detail below in a purely exemplary manner on the basis of specific exemplary embodiments schematically depicted in the drawings, with further advantages of the invention also being discussed. In detail:

FIG. 6 shows the cooperation between an angle encoder and inertial measurement units of a location determination apparatus according to the invention.

DETAILED DESCRIPTION

Figure 1:
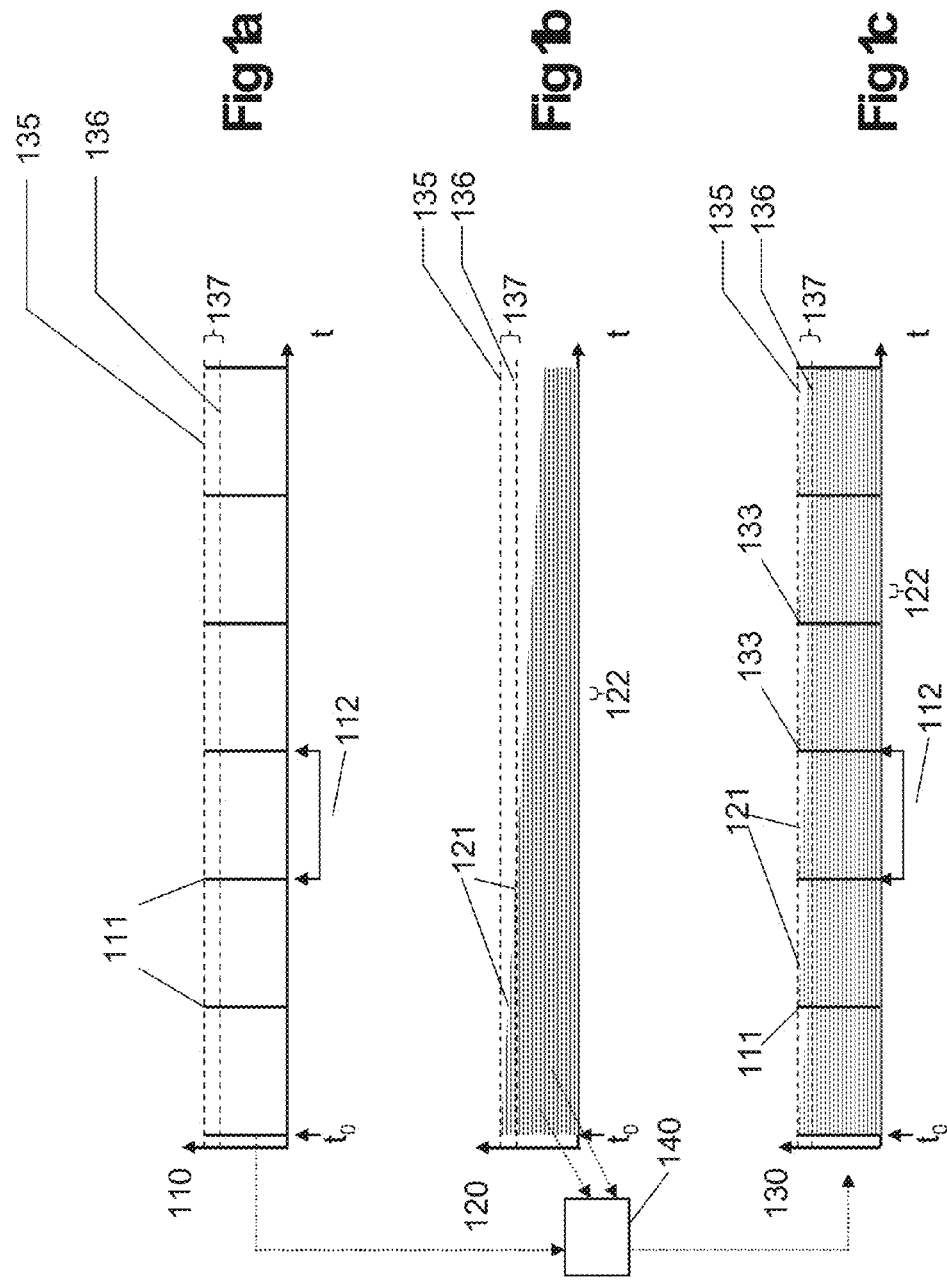
FIG. 1a/1b/1c show an illustration of a measurement method which can be carried out using a location determination apparatus according to the invention.

FIGS. 1a, 1b, 1c illustrate a measurement method which can be carried out with the location determination apparatus according to the invention.

Here, FIG. 1a schematically shows first position determination data 110, acquired during a course of time t, which are measured by a location encoder according to the prior art, such as e.g. a linear encoder or an angle encoder, as absolute first determination values 111 at time intervals 112. The acquired determination values 111 usually correspond with a desired maximum accuracy 135 and exceed a predetermined minimum accuracy 136, which is defined by a difference 137 between the maximum accuracy 135 and the minimum accuracy 136. Here, the time intervals 112 between sequentially acquired absolute first determination values are relatively large, or the corresponding data acquisition rate is relatively low, typically corresponding to a measurement rate of the order of 1 Hz to 20 Hz.

FIG. 1b schematically shows a typical time profile t of second position determination data 120, which are generated from acceleration or position change data of mobile components of the location determination apparatus, as measured by an inertial measurement unit. Assigned second determination values 121 are recorded sequentially at relatively short time intervals 122 or with a relatively high corresponding data acquisition rate.

At an initial time t0, the determination values 121 of the second position determination data correspond to a value of corresponding maximum accuracy 135, for example due to an initial calibration. However, the further determination values 121, recorded in sequence exhibit, a temporal drift, as depicted schematically in FIG. 1b, with a pronounced drop below the predefined minimum accuracy 136. This is due to the fact that sensors of an inertial measurement unit only supply measurement values on the basis of accelerations or changes in position, but no absolute position determination data. As a result of this, position determination data derived from the measurement values of such sensors are subject to a continuous drift, in particular on the basis of propagating and hence accumulating errors in the measurement of accelerations or changes in position.

Therefore, an inertial measurement unit is advantageous for data acquisition at a high measurement rate, for example of the order of 50 Hz to 2000 Hz, but it is not suitable as only a device for generating position determination data with a continuously sufficient accuracy.

The approach according to the invention is illustrated on the basis of FIG. 1c. According to the invention, an evaluation unit 140 is assigned to the location determination apparatus, which evaluation unit is configured to read the first position determination data 110, generated by the at least one location encoder, and the second position determination data 120, generated by the at least one inertial measurement unit, together with the corresponding determination values 111, 121 thereof, to correlate these determination data with one another in time and, at predetermined time intervals 132, to correct the second position determination data 120 or second determination values 121 received by the inertial measurement unit to absolute first position determination data 110 previously received by the location encoder or first determination values 111 and, thereby, in each case set a new initial value 133 for second position determination data 120 or second determination values 121 continuing to be received over the course of time.

As a result, combined position determination data 130 are generated at very short time intervals 122 corresponding to the time intervals 122 with an inertial measurement unit, which position determination data are, however, due to the corrections of the second position determination data undertaken at the time intervals 132 in each case, fixed within a predefined deviation 137 between the maximum accuracy 135 and the predefined sufficient accuracy 136.

In accordance with one embodiment, the evaluation unit 140 is configured to bring about corrections and resettings of the received second position determination data 120 at a time interval 132, which can be defined by a user of the location determination apparatus by an interval to a pre-definable deviation 137 between an absolute value, generated by the first position determination data, and a deviating second determination value 121, generated by the second position determination data.

Figure 2:
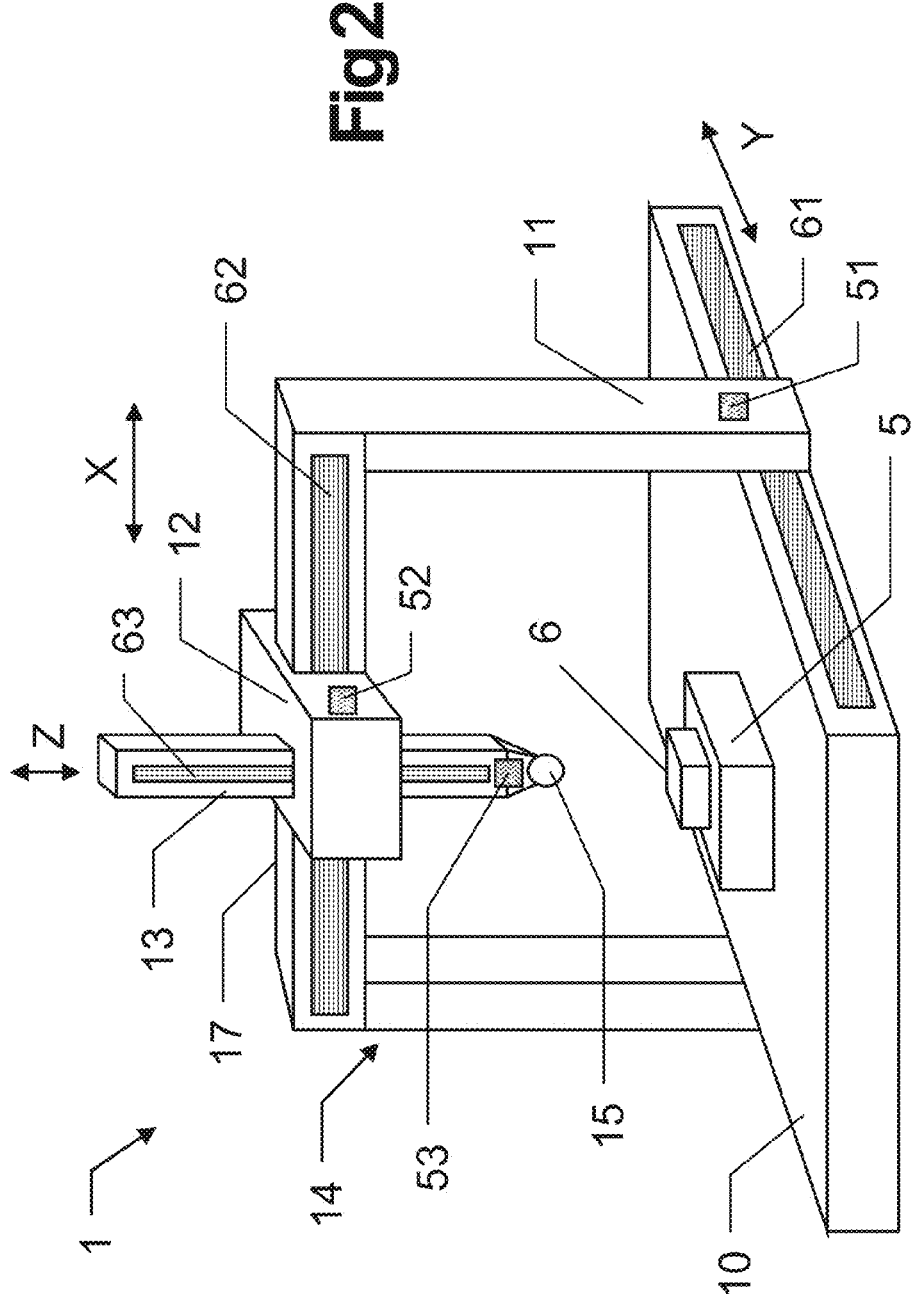
FIG. 2 shows a coordinate measuring machine according to the invention, embodied in an exemplary manner as a portal coordinate measuring machine and equipped with a location determination apparatus according to the invention.

FIG. 2 shows a coordinate measuring machine 1 according to the invention, embodied in an exemplary manner as a portal coordinate measuring machine 1.

The coordinate measuring machine 1 has a base 10, on which a portal 14 is arranged in such a way that it can be moved in a longitudinal direction (Y-direction). The portal 14 has two portal supports 11, which are connected to one another at their upper ends by a bridge 17.

An X-carriage 12 is arranged on the bridge 17, which X-carriage can be moved along the bridge 17, i.e. in a spatial direction (X-direction) connecting the two portal supports 11. A rod or Z-column 13 can be moved along a third spatial direction (Z-direction) and it is guided in a receptacle of the X-carriage 12. For this movement in the Z-direction, the Z-column 13 is guided by bearings which are components of the carriage 12. The three spatial directions X, Y and Z are preferably aligned perpendicular to one another, even if this is not a precondition for the present invention.

The coordinate measuring machine 1 is provided for determining one or many measurement points 6 on an object 5 and therefore has three linear guide mechanisms for enabling the movement of a measurement head 15, which is arranged at the lower, free end of the Z-column 13 facing the base 10 and for example embodied for tactile measurements, in the three spatial directions X, Y and Z relative to the base 10.

Each linear guide mechanism has an associated guide (in X-, Y- and Z-direction). Moreover, each one of the linear guide mechanisms has an assigned location encoder, embodied as a linear coder in this example, for determining the position in the assigned guide direction, wherein the respective linear encoders cooperate with associated codes 61, 62, 63 embodied as measurement scales 62, 61, 63 for determining the positions in X-, Y- and Z-direction.

According to the invention, the coordinate measuring machine moreover has inertial measurement units 51 for measuring accelerations and changes in position of the portal 14 with the portal supports 11 in the Y-direction, 52 for measuring accelerations and changes in position of the carriage 12 in the X-direction and 53 for measuring accelerations and changes in position of the Z-column 13 with the sample head 15 in the Z-direction.

The functionality and method of operation of the location determination apparatus, which in this example consists of the combination of the location encoders, which have the measurement scales 61, 62, 63, with the inertial measurement units 51, 52, 53, is analogous to what was described above on the basis of FIGS. 1a to 1c.

The invention is not restricted to portal coordinate measuring machines as depicted in FIG. 2. Rather, any known type of coordinate measuring machine, in particular e.g. also a so-called "articulated arm coordinate measuring machine", which enables an object surface measurement by means of a suitable measurement head, is suitable for the invention.

Figure 3:
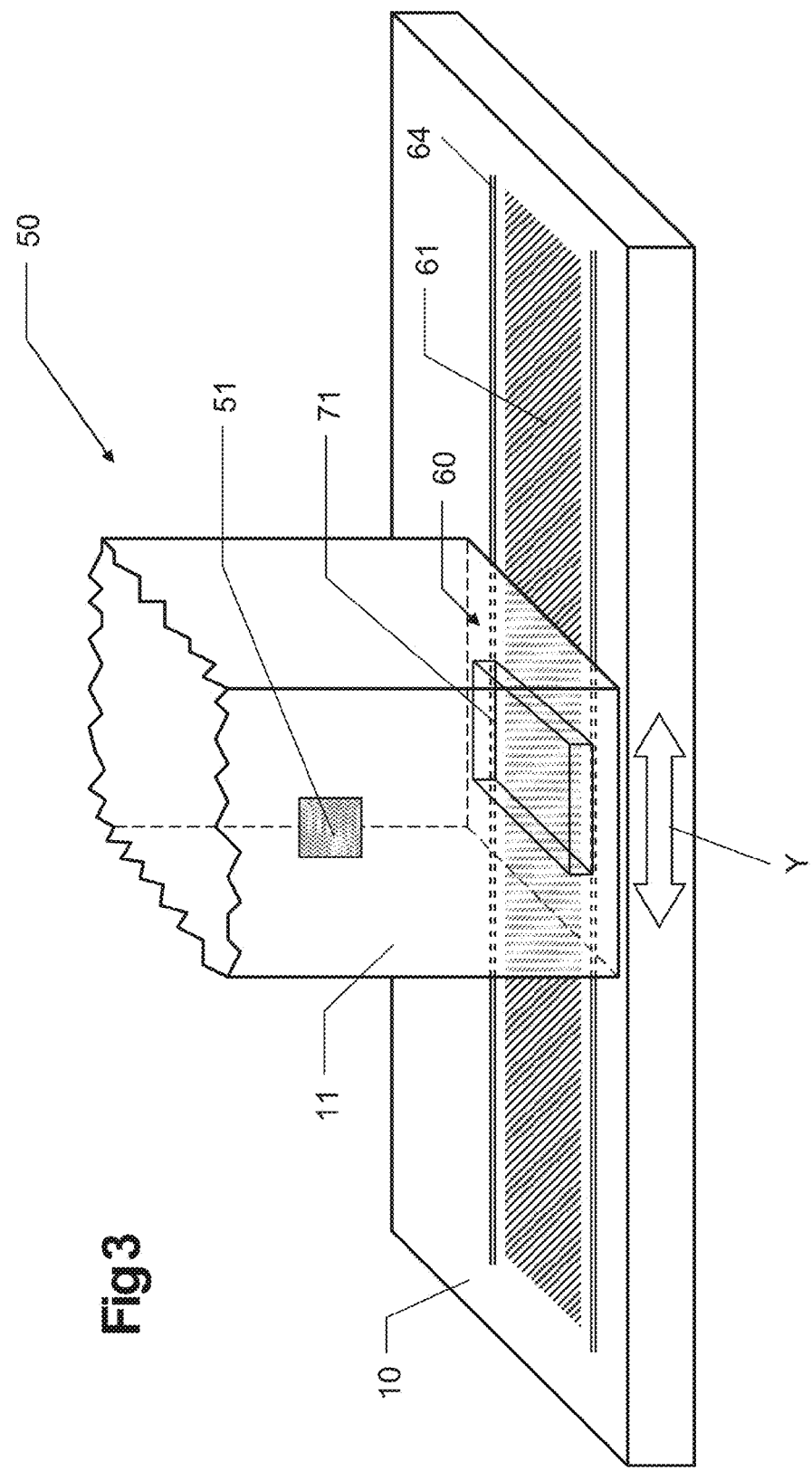
FIG. 3 shows, in a magnified illustration corresponding to the portal coordinate measuring machine from FIG. 2, an illustration of the cooperation between the linear encoder and an inertial measurement unit of a location determination apparatus according to the invention.

In a magnified illustration corresponding to the portal coordinate measuring machine 1 from FIG. 2, FIG. 3 illustrates the cooperation between a linear encoder 60 and an inertial measurement unit 51 of a location determination apparatus 50 according to the invention. The linear encoder 60 comprises a read head 71 for reading a code 61 of a code carrier 64. The read head 71 is arranged at the lower end of a portal support 11 in a suitable vicinity to the code carrier 64 attached to the base part 10 so as to be able to read the code 61 thereof. An inertial measurement unit 51 for measuring accelerations or changes in position of the portal support 11 with respect to the base part 10 is arranged on the portal support 11.

Figure 4:
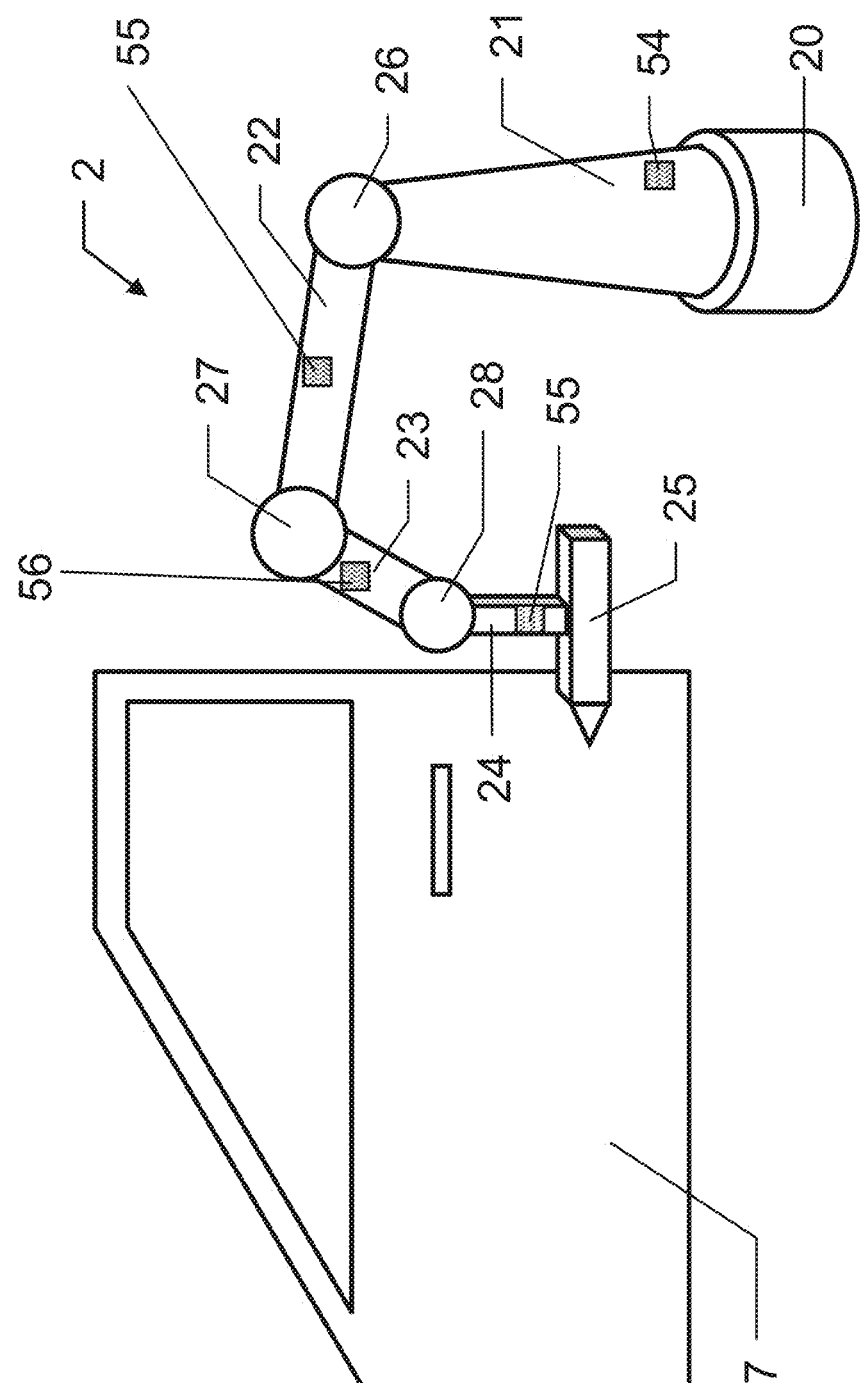
FIG. 4 shows a robot arm, which is equipped with a location determination apparatus according to the invention.

A location determination apparatus according to the invention can also be used for checking or monitoring the changes in position of movable components of a robot arm 2 with a tool 25, guided thereby, for machining an object 7, as is depicted in an exemplary manner in FIG. 4. In this example, the object 7 to be machined is an automobile door. The robot arm 2, depicted in a schematic and exemplary manner, comprises a plurality of sections 20, 21, 22, 23, 24, which can be adjusted or rotated relative to one another by means of hinges 26, 27, 28. Typically, such a robot arm, for example as a component of a machine tool, is remotely controlled by an evaluation, monitoring and control unit (not depicted here). The hinges 26, 27, 28 are equipped with location encoders (likewise not depicted here), embodied as angle encoders for, in this case, determining rotations of the sections 20, 21, 22, 23, 24 with respect to one another. In order to determine accelerations and enable a high measurement rate, inertial measurement units 54, 55, 56 and 57 are attached to the robot arm sections 21, 22, 23 and 24 in each case.

Figure 5:
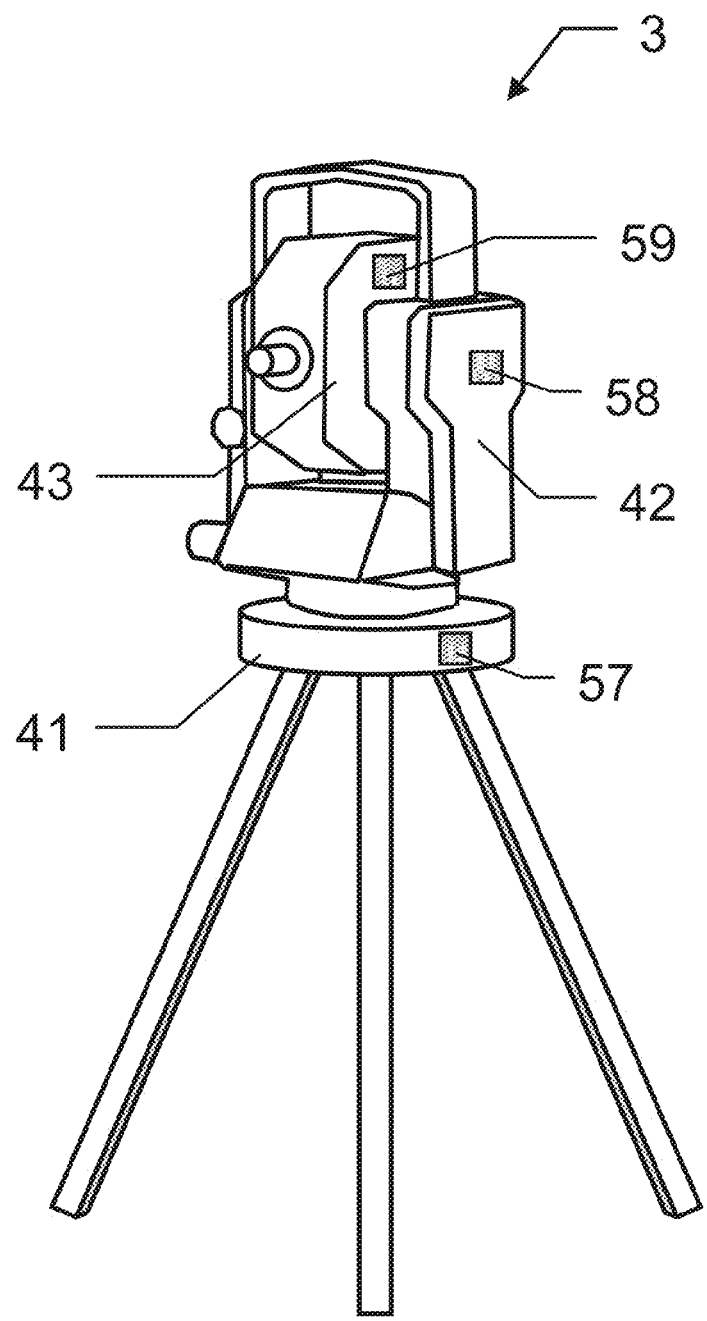
FIG. 5 shows a geodetic surveying machine according to the invention, embodied as a theodolite in an illustrative manner, which is equipped with a location determination apparatus according to the invention.

As a further example for use, FIG. 5 shows a geodetic surveying machine, embodied illustratively as a total station or as a theodolite 3, which is equipped with a location determination apparatus according to the invention.

In this example, the theodolite 3 comprises a base 41, embodied as a three-legged stand, with an upper part 42 mounted thereon in a rotatable manner. A sighting unit 43, pivotably mounted on the upper part 42, is typically equipped with a laser source embodied to emit a laser beam and with a laser light detector, and therefore provides a ranging functionality for determining the position of a target object.

The spatial alignment of the sighting unit 43 with respect to the base 41 can be acquired by means of two angle measuring units or angle encoders (not depicted here).

In order to determine accelerations and enable a high measurement rate, inertial measurement units 57, 58 and 59 are respectively attached to the base 41, to the upper part 42 and to the sighting unit 43.

FIG. 6 illustrates the cooperation between an angle encoder 80 and inertial measurement units 51 of a location determination apparatus 50 according to the invention. Two arm-like sections 31 and 32 are connected to one another by means of a hinge 29 and can be pivoted about this hinge 29 against one another in the direction of the arrow 83. The angle settings between the two sections 31 and 32 are measured by an angle encoder 81. The angle encoder 80 comprises a read head 84 for reading a code 81 with a plurality of concentric code tracks on a code carrier 81. In order to determine accelerations and enable a high measurement rate, inertial measurement units 59' and 59" are arranged on the two sections 31 and 32 that can be pivoted with respect to one another.

What is claimed is:

1. Location determination apparatus for two components, mobile relative to one another, of a measuring machine for determining a location of the two components relative to one another, wherein the location determination apparatus comprises at least one location encoder having a read head in cooperation with a code for generating first position determination data with respect to the location at a first measurement rate, wherein:
    at least one inertial measurement unit for determining translational and/or rotational accelerations of at least one of the two components and, moreover, for generating second position determination data with respect to the location at a second measurement rate—which is higher than the first measurement rate; and
    an evaluation unit, which is embodied and configured to acquire the first position determination data generated by the at least one location encoder and the second position determination data generated by the at least one inertial measurement unit, correlate said position determination data with one another and determine the location therefrom at a third measurement rate, which is at least higher than the first measurement rate.

2. The location determination apparatus according to claim 1, wherein the evaluation unit is embodied and configured to determine the location on the basis of the second position determination data for times within intermediate time windows which lie between successive measurement times of the first measurement rate.

3. The location determination apparatus according to claim 2, wherein the second position determination data are only used in each case for the intermediate time window and the location is determined on the basis of the first position determination data only for measurement times of the first measurement rate.

4. The location determination apparatus according to claim 1, wherein the evaluation unit is embodied and configured to reference the acquired second position determination data, in each case with respect to a respectively most current available value for the first position determination data.

5. The location determination apparatus according to claim 1, wherein the evaluation unit is embodied to correlate the first position determination data and the second position determination data with the aid of a defined algorithm to which the first and second position determination data are fed and which operates clocked at a rate which is at least as high as the third measurement rate.

6. The location determination apparatus according to claim 5, wherein the defined algorithm comprises a Kalman filter or a divided-difference filter.

7. The location determination apparatus according to claim 5, wherein the rate equals the third measurement rate.

8. The location determination apparatus according to claim 1, wherein the third measurement rate is at least 1000 Hz.

9. The location determination apparatus according to claim 1, wherein the read head has an optically reading sensor comprising a sensor line or an area sensor, and the code is formed by an optically readable pattern made of a multiplicity of optical code elements.

10. The location determination apparatus according to claim 1, wherein the read head has a capacitively reading sensor and the code is formed by a capacitively readable pattern made of a multiplicity of code elements with structured plates or plastic strips.

11. The location determination apparatus according to claim 1, wherein the read head has an inductively reading sensor comprising one or more coils, and the code is formed by an inductively readable pattern made of a multiplicity of code elements with magnetic strips.

12. The location determination apparatus according to claim 1, wherein:
    the location encoder is embodied as a linear encoder with a read head for reading a linear code or as an angle encoder with a read head for reading a code arranged in a substantially circular or circular arc shaped manner.

13. The location determination apparatus according to claim 1, wherein:
    the inertial measurement unit has acceleration sensors and/or torque sensors and is embodied as a MEMS microsystem.

14. A measuring machine comprising the location determination apparatus according to claim 1, and wherein the location determination apparatus is assigned to each longitudinally displaceable axis or each hinge.

15. A location determination method for two components, mobile relative to one another, of a measuring machine for determining a location of the two components relative to one another, the method comprising:
    generating first position determination data with respect to the location at a first measurement rate using a location encoder, which has a read head in cooperation with a code,
    generating second position determination data with respect to the location at a second measurement rate that is higher than the first measurement rate using an inertial measurement unit which, to this end, determines translational and/or rotational accelerations of at least one of the two components, and
    correlating the first and the second position determination data with one another and, following therefrom, determining the location at a third measurement rate, which is at least higher than the first measurement rate.

16. The location determination apparatus according to claim 15, wherein for times within intermediate time windows which lie between successive measurement times of the first measurement rate, the location is determined on the basis of the second position determination data.

17. The location determination apparatus according to claim 15, wherein the second position determination data are only used in each case for the intermediate time window and the location is determined on the basis of the first position determination data only for measurement times of the first measurement rate.

18. The location determination apparatus according to claim 17, wherein the acquired second position determination data are respectively newly referenced, in each case with respect to a respectively most current available value for the first position determination data.

19. The location determination apparatus according to claim 15, wherein the first and second position determination data are correlated with the aid of a defined algorithm to which the first and second position determination data are fed and which operates clocked at a rate which is at least as high as the third measurement rate that equals the third measurement rate.

20. A computer program product with program code, which is stored on a machine-readable medium, for controlling and carrying out the method comprising:
generating first position determination data with respect to the location at a first measurement rate using a location encoder, which has a read head in cooperation with a code,
generating second position determination data with respect to the location at a second measurement rate that is higher than the first measurement rate using an inertial measurement unit which, to this end, determines translational and/or rotational accelerations of at least one of the two components, and
correlating the first and the second position determination data with one another and, following therefrom, determining the location at a third measurement rate, which is at least higher than the first measurement rate.

* * * * *